Patented Feb. 26, 1952

2,587,286

UNITED STATES PATENT OFFICE 2,587,286

RECOVERING CONCENTRATES OF VANADIUM AND/OR URANIUM FROM RAW MATERIALS

Nils Herman Brundin, Hoganas, Sweden, assignor to Ekstrand & Tholand, Inc., New York, N. Y., a corporation of New York No Drawing. Application October 26, 1948, Serial No. 56,658. In Sweden November 27, 1946

17 Claims. (Cl. 23—14.5)

It is known that certain, common, natural materials such as clays, slates and bauxites in addition to their main components alumina, silica and iron oxides, also contain remarkable amounts of vanadium and, in some cases, uranium. For instance, certain clays in American coal-bearing formations hold up to 100 to 200 grams of uranium per ton. Certain alum-shales in Sweden contain the same amount of uranium together with 2000 grams of vanadium per ton.

It is also known that certain vanadium and/or uranium containing minerals such as roscoelite, carnotite, etc. have a wide spread occurrence in the ferruginous sandstones of some western States of the U. S. A. These minerals occur in the sandstones as layers or flat lenses with a thickness of from a few millimeters up to a couple of meters. The largest deposits known are already exhausted for production of radium. It is obvious that as the demand for uranium increases the tendency will be to exploit also the poorer deposits with an uranium content of perhaps a few hundred grams a ton of mined sandstone. Now it is very difficult to separate the uranium and/or vanadium containing minerals from the sandstone by conventional physical means and therefore it might prove suitable to treat all the mined rock by chemical methods.

Among the above mentioned materials, bauxite is well known as a source of aluminum and its compounds. Generally, alkaline decomposition is employed to avoid taking iron into solution. By this alkaline decomposition part of the vanadium contained in the bauxite is converted into soluble sodium vanadate and extracted together with sodium aluminate. From the solution vanadium might be recovered if the amount makes such a step economical.

All the other materials, however, cannot be treated with alkali because their high content of silica makes this treatment too expensive. Therefore, they have to undergo an acid decomposition. This has the further advantage, that at least uranium is more completely extracted than by alkaline treatment. By the acid decomposition most of the alumina, vanadium and/or uranium and part of the iron contained in the raw material are obtained in acid solution.

The problem of economically separating these components from each other in order to obtain marketable products is difficult because of the small amounts of vanadium and uranium compared with those of aluminum and iron.

A way out of the difficulties, according to my invention, is based on the following discovery: When from a solution containing bivalent iron in large excess over whatever amount of vanadium and uranium the solution contains, ferrous hydroxide is precipitated by the addition of a compatible basic substance, for example, ammonium hydroxide, all of the vanadium and uranium present is carried down with the thus first precipitated ferrous hydroxide. However, if the addition of the basic substance and the continued precipitation of the ferrous hydroxide is discontinued at the time, determined by test on a sample of the solution, that all of the vanadium and uranium originally present in the solution has thus been precipitated so that the solution contains no more of either of them, the resulting precipitate, separable by filtration, is very rich in vanadium and/or uranium, whichever of them was present in the solution originally. At least usually, the filtrate from such filtration containing the remainder of the dissolved iron not thus precipitated still shows an acid reaction.

In this manner, from a solution obtained after leaching, say with sulphuric acid, an alum-shale containing 0.25% of vanadium, it has been possible, after, for example, the intermediate removal of aluminum by crystallization as an alum and separating the crystals, to throw down a precipitate of ferrous hydroxide and along with it the vanadium, so that the precipitate, after filtration, washing and drying, contains about 10% of vanadium.

The present invention, based on the above described discovery, consists in a novel method of treating the leach solutions, obtained by acid decomposition and/or lixiviation of the above-mentioned naturally occurring starting materials and similar raw materials, to recover a concentrate of vanadium and/or uranium, and, further, for example, in starting with an alum-shale, to recover also an aluminum compound such as an alum, which method is more economical than earlier proposed methods.

The novel method according to the invention is characterized in that such leach solution, with or without the addition of a reducing agent, and in some instances after intermediate cooling to crystallize out, and then filtering off, the aluminum as a salt of slight solubility, for example, an alum, part of the iron is precipitated as hydroxide by the addition of a base until along with this hydroxide there has been thrown down all of the vanadium and/or uranium present so that the solution contains no more of either of these two latter metals and may still be acid or at worst neutral, and then separating from the solution the resulting precipitate containing all of the original vanadium and uranium and treating the precipitate to recover from it the vanadium and uranium contained in it. The filtrate is treated with an oxidizing agent and then with a basic substance to precipitate completely the iron as ferric hydroxide, followed, if desired, with recovery of other salts still dissolved in the solution.

Air bubbled through the solution can serve as an oxidizing agent.

When the decomposition of the starting raw material is carried out by the use of ammonium sulphate or acid ammonium sulphate, the complete precipitation of the iron by the second precipitation from the solution is particularly desirable in order to enable the recovery of ammonium sulphate which subsequently can be converted to ammonium acid sulphate and ammonia.

The following example illustrates the practice of the invention:

Example

A vanadiferous schist containing 0.35% of vanadium was, after roasting, leached in a hot solution of acid ammonium sulphate. After filtration, the filtrate contained aluminum, iron and vanadium together with ammonium sulphate and small quantities of alkali sulphate, magnesium sulphate, etc. After adding sufficient reducing agent to the filtrate to reduce the iron, the filtrate was cooled to precipitate most of its aluminum content as ammonia alum which latter was then separated from the filtrate. Ammonia was added to this latter filtrate in an amount to precipitate iron as ferrous hydroxide and until there was thrown down with it all of the vanadium that existed in the original solution. At this stage the reaction mixture was still acid. The precipitated ferrous hydroxide along with its content of vanadium was filtered off, washed and treated for the recovery of the vanadium. (On a dry basis that precipitate contained 10% of vanadium calculated as the metal.)

In the case of a low iron content in the starting raw material, the filtrate from the precipitated ferrous hydroxide often is neutral. This filtrate still contains iron because there was not added enough basic substance to precipitate all of it. Where the iron content of the original solution from the leaching of the starting material is low, this residual iron is present only as colloidal ferrous hydroxide, whereas in the case of an iron-rich original solution, this residual iron is present also as ferrous sulphate. In both cases, the iron then is completely removed by precipitation in the form of ferric hydroxide. This is done, in each case, by first oxidizing the iron in solution to the ferric state by an oxidizing agent, for example, by passing air through the solution, but in the case of the iron-rich original solution, after first neutralizing the solution, as by adding ammonia. After this ferric hydroxide has been removed, for example, by being filtered off, its filtrate is evaporated for the recovery of ammonium sulphate. If desired, the ammonia alum initially obtained, before the ferrous hydroxide precipitation, can, for example, after being dissolved, be converted into aluminum hydroxide and ammonium sulphate solution by adding ammonia, and from the filtrate obtained from removing the aluminum hydroxide, ammonium sulphate is recovered by evaporation. The thus obtained ammonium sulphate together with that recovered from the filtrate from the complete precipitation of the iron, is heated to about 375° C. to obtain acid ammonium sulphate and ammonia, which are re-used in the process.

Thus, the process according to the invention theoretically operates without loss of chemicals and may be considered as a development of Buchner's so-called "Aloton-process" (described in "Aluminum and its Production" by Julius David Edwards, Francis C. Frary and Caty Jeffreys, McGraw-Hill Book Company, 1930, pages 188–190).

Some of the raw materials suitable for the process, for example alum-shales may also contain considerable amounts of potassium, which is recovered as potassium alum mixed with the ammonia alum. After precipitation of aluminium hydroxide, a filtrate of potassium sulphate and ammonium sulphate is obtained, from which solution the two salts can be obtained separately by fractional crystallisation.

If the uranium content in the raw material is low compared to vanadium, it may be convenient to carry out the precipitation in three steps, one for recovering an uranium concentrate containing vanadium, the second for obtaining a vanadium concentrate, and the third for complete removal of the residual iron as ferric hydroxide.

I claim:

1. A method of obtaining concentrates of the vanadium and uranium compounds from acid, aqueous solutions having a low concentration of dissolved compounds of at least one of the metals of the class consisting of vanadium and uranium together with large concentrations of other dissolved metallic compounds of the class comprising iron and aluminum compounds, which method comprises converting to the bivalent state substantially all of any ferric iron present in the solution and any pentavalent uranium present to the quadrivalent state, thereafter adding to said solution a base in a quantity to precipitate substantially only as much ferrous hydroxide as is precipitated by the time all the vanadium and uranium is completely precipitated from the solution, separating from the solution the mixed precipitate of ferrous hydroxide containing the precipitated vanadium and uranium compounds, and treating said mixed precipitate for the recovery of a concentrate of said vanadium and uranium compounds.

2. A method as claimed in claim 1, wherein a reducing agent is added to the solution initially to convert trivalent iron to the bivalent state and pentavalent uranium to the quadrivalent state, and thereafter the base is added to throw down the mixed precipitates of ferrous hydroxide and the uranium and vanadium compounds.

3. A method as claimed in claim 2, wherein prior to the addition of the base, the temperature of the solution is lowered until it is cool enough to cause aluminum to crystallize out as an alum of it of lesser solubility than the other compounds dissolved in the solution, and the alum is removed.

4. A method as claimed in claim 2, wherein the filtrate obtained after removing the mixed precipitates of ferrous hydroxide and the vanadium and uranium compounds is oxidized to convert the residual iron to the ferric state and thereafter a base is added to bring the solution at least to the neutral point and precipitate substantially all of the residual iron as ferric hydroxide.

5. A method as claimed in claim 4, wherein air is passed through the solution to oxidize the iron to the ferric state.

6. A method as claimed in claim 4, wherein the base employed to precipitate the ferric hydroxide is ammonia.

7. A method as claimed in claim 4, wherein the precipitated ferric hydroxide is separated from the remaining solution and the latter is treated for the recovery of chemicals remaining in it.

8. A method as claimed in claim 1, wherein the starting solution was obtained by treating the starting material with acid ammonium sulphate and prior to the precipitation of ferrous hydroxide aluminum was separated as ammonium alum and the base added to precipitate the ferrous hydroxide is ammonia.

9. A method as claimed in claim 1, wherein the starting acid, aqueous solution is of the low iron type, and prior to the addition of the base, any aluminum in the solution is removed as a less soluble alum which is separated from the solution, to which latter solution an alkaline hydroxide is then added until the reaction is at least neutral thereby precipitating part of the iron as ferrous hydroxide along with all the vanadium and uranium originally present in the solution and leaving some of the iron as ferrous hydroxide in colloidal form in the filtrate after separating the mixed precipitates.

10. A method as claimed in claim 9, wherein the colloidal ferrous hydroxide in the filtrate obtained from the separation of the mixed precipitates is oxidized to the ferric state and completely precipitated as ferric hydroxide.

11. A method as claimed in claim 9, wherein the aluminum is precipitated as ammonium alum because of the ammonium ions contained in the starting solution from the use of an ammonium compound which is a member of the class consisting of ammonium sulphate and acid ammonium sulphate in leaching from the natural materials the metal ions contained in the starting solution, and the alkaline hydroxide used in precipitating the ferrous hydroxide is ammonium hydroxide.

12. The method as claimed in claim 9, wherein the precipitation of the ferrous hydroxide is carried out in two stages, the first by adding the alkaline hydroxide until all of the uranium is precipitated with ferrous hydroxide and some of the vanadium and removing the resulting mixed precipitate as an uranium concentrate containing vanadium, and the second stage by adding more alkaline hydroxide until the balance of the vanadium is precipitated with additional ferrous hydroxide precipitate and separating the thus resulting second mixed precipitate as a vanadium concentrate free of uranium.

13. A method of extracting vanadium and uranium values from natural raw materials, which comprises dissolving said values from the raw materials by digesting the latter with an ammonium sulphate which is a member of the class consisting of ammonium sulphate and acid ammonium sulphate, removing from the insolubles the solution of said values and of such other substances as are thus dissolved along with them, removing aluminum in the form of ammonium alum from the solution as a result of the greater insolubility of ammonium alum than other ingredients in the solution, converting to the bivalent state substantially all of any ferric iron present in the solution and any pentavalent uranium to the quadrivalent state, adding ammonia until all of the vanadium and uranium are precipitated along with so much of the iron as is precipitated as ferrous hydroxide by then, removing the mixed precipitates, oxidizing the residual iron in the filtrate to the ferric state by the addition of an oxidizing agent to the filtrate, separating the ferric iron by the addition of ammonia to precipitate it completely as ferric hydroxide, removing the precipitated ferric hydroxide, and concentrating the thus resulting filtrate to recover therefrom ammonium sulphate.

14. The method as claimed in claim 13, wherein the separated ammonium alum is taken into aqueous solution and aluminum hydroxide is precipitated therefrom by the addition of ammonia and separated from the solution leaving ammonium sulphate in the resulting filtrate, and the ammonium sulphate combined with the ammonium sulphate obtained from the filtrate from the ferric hydroxide precipitate is used for digestion of a new batch of raw material.

15. The method of extracting vanadium and uranium values from raw materials containing them in very low percentages along with comparatively very high percentages of compounds of aluminum and iron, which method comprises extracting the said vanadium and uranium values from the raw materials by digesting the latter with acid ammonium sulphate, treating the separated leach with a reducing agent to reduce the iron content to the bivalent state, cooling the solution to separate the aluminum present as ammonium alum and removing the separated ammonium alum, adding ammonia until substantially all of the vanadium and uranium values are precipitated with only as much of the ferrous hydroxide as does precipitate at that point and substantially none of said values still remain in solution, and removing the mixed precipitates thus obtained.

16. A method as claimed in claim 15, wherein the filtrate left after removing the mixed precipitates is treated with an oxidizing agent for the ferrous iron to convert it to the ferric state and additional ammonia is added completely to precipitate the residual iron as ferric hydroxide and the latter is separated from the reaction, and the resulting filtrate is concentrated to recover ammonium sulphate therefrom, and the aluminum alum is taken into solution and ammonia added to it to precipitate aluminum hydroxide which is then removed and the filtrate therefrom is concentrated to yield ammonium sulphate, and the ammonium sulphate is converted to acid ammonium sulphate and ammonia, and the said acid ammonium sulphate is used to digest a further batch of raw material and the said ammonia is used for the precipitation of iron in such further batch as hydroxide and for converting ammonium alum into aluminum hydroxide and ammonium sulphate.

17. A method as claimed in claim 15, wherein the ammonium sulphate recovered from the ammonium alum and also from the filtrate from the ferric hydroxide precipitate is converted into acid ammonium sulphate and ammonia, the said acid ammonium sulphate being used to digest a further batch of raw material and the said ammonia for precipitating iron as hydroxide and for converting ammonium alum into aluminum hydroxide and ammonium sulphate.

NILS HERMAN BRUNDIN.

REFERENCES CITED

The following references are of record in the file of this patent:

UNITED STATES PATENTS

| Number | Name | Date |
| --- | --- | --- |
| 2,176,609 | McCormack | Oct. 17, 1939 |
| 2,176,610 | Stamberg | Oct. 17, 1939 |
| 2,180,692 | Potter | Nov. 21, 1939 |
| 2,199,696 | Fleck | May 7, 1940 |